United States Patent [19]

Chang et al.

[11] 4,125,570

[45] Nov. 14, 1978

[54] METHOD OF STABILIZING THE GLOSS RETENTION OF THERMOSETTING RESINS CONTAINING HYDROXYL GROUPS

[75] Inventors: Wen-Hsuan Chang, Gibsonia; Samuel Porter, Jr., Tarentum; Marco Wismer, Gibsonia, all of Pa.

[73] Assignee: PPG Industries, Inc., Pittsburgh, Pa.

[21] Appl. No.: 774,296

[22] Filed: Mar. 4, 1977

Related U.S. Application Data

[63] Continuation of Ser. No. 361,011, May 16, 1973, abandoned.

[51] Int. Cl.$^2$ .................. C08L 61/20; C08L 61/32
[52] U.S. Cl. .................................. 260/849; 260/850; 260/851; 528/273
[58] Field of Search ............... 260/849, 45.8 N, 850, 260/75 TN, 851

[56] References Cited

U.S. PATENT DOCUMENTS

| | | | |
|---|---|---|---|
| 2,937,159 | 5/1960 | McKay et al. | 260/45.9 P X |
| 3,422,046 | 1/1969 | Thomas et al. | 260/849 X |
| 3,553,117 | 1/1971 | Gutweiler | 260/45.9 P X |
| 3,626,023 | 12/1971 | Brizgys | 260/849 |
| 3,759,873 | 9/1973 | Hudak | 260/75 NK |
| 3,862,261 | 1/1975 | Stoddard | 260/849 |
| 3,912,790 | 10/1975 | Chang et al. | 260/849 |
| 3,960,983 | 6/1976 | Blank | 260/849 X |

Primary Examiner—Carman J. Seccuro
Attorney, Agent, or Firm—William J. Uhl

[57] ABSTRACT

Thermosetting resins containing hydroxyl groups which can be cured with aminoplast resins are stabilized by the addition of 1,4-diazo[2,2,2]-bicyclooctane. This method is particularly useful in stabilizing the gloss retention of extensible coatings formed by curing a hydroxyl-containing urethane product with an aminoplast resin. Such coatings can be applied to virtually any solid substrate and are especially useful on rubbery, resilient substrates such as polyurethane or polyethylene foam, natural or synthetic rubber or rubber foam, and various elastomeric plastic materials. They are also particularly useful on other substrates such as mild steel or aluminum.

12 Claims, No Drawings

METHOD OF STABILIZING THE GLOSS RETENTION OF THERMOSETTING RESINS CONTAINING HYDROXYL GROUPS

BACKGROUND OF THE INVENTION

Recent advances in coating technology have provided coatings which are suitable for use over various substrates which are difficult to coat and which have many different properties. Coatings of excellent appearance, a high order of durability and having the ability to withstand severe environmental conditions have been obtained. Among the more advanced coatings are those employed on vehicles, such as automobiles, where good appearance must be maintained over long periods despite exposure to weather and various forms of attack during use.

Thermosetting resins have long been useful as coating materials. Such compositions can be tailored to achieve a great variety of properties, including high strength, extensibility and durability. While such coating compositions have many excellent properties, a recurring problem with such resins, particularly thermosetting resins which are cured by aminoplast resins has been the instability of the cured resins resulting in a substantial loss of gloss over periods of time.

SUMMARY OF THE INVENTION

It has now been found that the addition of minor amounts of 1,4-diazo[2,2,2]-b:cyclooctane, sometimes called triethylenediamine, to thermosetting resins, either before, during or after addition of the curing agent, unexpectedly stabilizes the gloss retention of such resins.

The thermosetting resins of the instant invention which are stabilized by the secondary or tertiary amines include those resins which contain hydroxyl groups, and which can be cured with aminoplast resins. Examples of these thermosetting resins include saturated polyester polyols having hydroxyl values of at least about 30; hydroxyl-containing polyacrylates having hydroxyl values of at least about 5; polyether polyols having hydroxyl equivalents of at least about 100; and, polyurethane polyols having hydroxyl values of at least about 10. The preferred thermosetting resins are the polyurthane polyols.

DETAILED DESCRIPTION OF THE INVENTION

The compositions of the instant invention contain as one component, a thermosetting resin containing hydroxyl groups. Preferably, the thermosetting resin is a polyurethane polyol.

The polyurethane polyols, useful in the instant invention, are produced by reacting a polyhydric material selcted from the group consisting of polyether polyols, polyester polyols and mixtures thereof, with an organic polyisocyanate, under conditions selected so as to produce an hydroxyl-containing urethane reaction product, i.e., a polyurethane polyol. This can be accomplished by utilizing an equivalent ratio of isocyanate groups in the polyisocyanate to hydroxyl groups in the polyhydric material of less than 1.0 and preferably 0.90 or less, and allowing substantially all of the isocyanate groups present to react. When using ratios of less than 1.0, care must be taken to avoid gelation and for this reason, some mono-alcohol may be necessary. In general, both the polyol, (i.e., material having functionality of 3 or more) content and the mono-alcohol content must be carefully controlled. One way to ascertain in any given case the amounts of polyol and mono-alcohol which should be used to avoid gelation is by carrying out successive tests on a small scale with varying proportions of components. It is, in most cases, more convenient to terminate the reaction at the desired stage (determined by viscosity), as by the addition of a compound which reacts with the residual isocyanate groups, thus permitting the use of higher ratios of isocyanate to hydroxyl (i.e., greater than 1.0). Regardless of the method chosen, the reaction between the polyhydric material and the polyisocyanate should generally be terminated when the reaction product has an intrinsic viscosity of 1.0 deciliters per gram or less and preferably 0.80 or less, since it has been found that resins with higher viscosities exhibit poor sprayability. It should be noted that useful products are provided once the reaction between the polyhydric material and the polyisocyanate begins although preferred products begin to be obtained when the intrinsic viscosity reaches about 0.05. Generally, to start the reaction, heat (e.g., 125° F.) and catalyst (e.g., dibutyl tin dilaurate) may be used. The use of heat and catalyst is of course dependent upon the overall composition and the rate of reaction desired.

In producing the desired polyurethane polyol, it is necessary that the polyhydric material employed possess certain properties in order to obtain coatings of the desired characteristics. When using a polyester polyol, these properties are obtained by selecting a polyether polyol, or a mixture of polyether polyols, having relatively long chains per hydroxyl group, and which thus has a hydroxyl equivalent of at least about 100 and preferably at least about 300. The polyether polyol component in most cases consists essentially of one or more diols. Triols or higher polyols can also be used in whole or in part, provided the polyhydric material contains no more than about one gram-mole of compounds having a functionality of 3 or more per 500 grams of the polyhydric material. While it is not always necessary to have a triol or higher polyol present, some branching is desirable, although the polyether should not be highly branched. There may also be present a small amount of mono-alcohol, particularly if larger proportions of higher polyol are used. In certain instances, such as where very high molecular weight polyether polyols are used, the polyols can be largely or even entirely made up of compounds of functionality higher than 2.

Among the preferred polyether polyols are poly(oxyalkylene)glycols. Included are poly(oxytetramethylene)glycols, poly(oxyethylene)glycols, poly(oxytrimethylene)glycols, poly(oxypentamethylene)glycols, polypropylene glycols, etc. The preferred polyether polyols of this class are poly(oxytetramethylene)glycols of molecular weight between about 400 and about 10,000.

Also useful are polyether polyols formed from the oxyalkylation of various polyols, for example, glycols such as phenylene glycol, 1,6-hexanediol, and the like, or higher polyols, such as trimethylolpropane, trimethylolethane, pentaerythritol, and the like. Polyols of higher functionality which can be utilized as indicated can be made, for instance, by oxyalkylation of compounds as sorbitol or sucrose. One commonly utilized oxyalkylation method is by reacting a polyol with an alkylene oxide, e.g., ethylene or propylene oxide, in the presence of an acidic or basic catalyst.

In addition to the methods indicated, the polyether polyol can be produced by any of the several known techniques, with the reaction conditions and the ratio or reactants chosen so as to provide a product having residual hydroxyl groups, i.e., a polyether polyol having a hydroxyl equivalent of at least about 100 and preferably not above about 10,000.

Where polyester polyols are employed, the requisite properties are attained by selecting a polyester polyol, or a mixture of polyester polyols, which is formed from a polyol component having an average functionality of at least about 1.9 and an acid component having an average functionality of at least about 1.9. The polyol component in most cases consists essentially of one or more diols with up to about 25 mole percent of polyols present having 3 or more hydroxyl groups. While it is not always necessary to have a triol or higher polyol present, some branching is desirable, although the polyester should not be highly branched. Again, in using higher polyols, care must be taken to insure that the total amount of material having a functionality of 3 or more in the polyhydric material must be no greater than about one gram-mole 500 grams of polyhydric material. There may also be present a small amount of monoalcohol, particularly if larger proportions of higher polyols are used. In certain instances, such as were very high molecular weight polyols are used, the polyols can be largely or even entirely made up of compounds of functionality higher than two.

The diols which are usually employed in making the polyester include alkylene glycols, such as ethylene glycol, propylene glycol, butylene glycol, and neopentyl glycol, and other glycols such as hydrogenerated bisphenol A, cyclohexane dimethanol, caprolactone diol (e.g., the reaction product of caprolactone and ethylene glycol), hydroxyalkylated bisphenols, polyether glycols, e.g., poly(oxytetramethylene)glycol, and the like. However, other diols of various types and, as indicated, polyols of higher functionality can also be utilized. Such higher polyols can include, for example, trimethylolpropane, trimethylolethane, pentaerythritol, and the like, as well as higher molecular weight polyols such as those produced by oxyalkylating low molecular weight polyols. An example of such a higher molecular weight polyol is the reaction product of 20 moles of ethylene oxide per mole of trimethylolpropane.

The acid component of the polyester consists essentially of monomeric carboxylic acids or anhydrides having 2 to 14 carbon atoms per molecule. The acids should have an average functionality of at least about 1.9; the acid component in most instances contains at least about 75 mole percent of dicarboxylic acids or anhydrides. The functionality of the acid component is based upon considerations similar to those discussed above in connection with the alcohol component, the total functionality of the system being kept in mind.

Among the acids which are useful are phthalic acid, isophthalic acid, terephthalic acid, tetrahydrophthalic acid, hexahydrophthalic acid, adipic acid, azelaic acid, sebacic acid, malic acid, glutaric acid, chlorendic acid, tetrachlorophthalic acid, and other dicarboxylic acids of varying types, such as lactones, tartaric acid and the like. The polyester may include minor amounts of monobasic acid, such as benzoic acid, and also there can be employed higher polycarboxylic acids, such as trimellitic acid and tricarballylic acid. Where acids are referred to above, it is understood that the anhydrides of those acids which form anhydrides can be used in place of the acid. It is preferred that the polyester include an aliphatic dicarboxylic acid as at least part of the acid component.

While polyester polyols have been specifically disclosed, it is to be understood that useful products are also attainable by substituting a polyester amide polyol, or a mixture of polyester amide polyols, for a part of or all of the polyester polyol. The polyester amide polyols are produced by conventional techniques from the above described acids and diols, and minor proportions of diamines or amino alcohols, Suitable diamines and amino alcohols include hexamethylene daimine, hydrazine, bis 4-aminocyclohexyl)methane, ethylene diamine, nonoethanol amine, phenylene diamine, toluene diamine and the like. It is to be understood that the polyester polyols of the instant invention include such polyester amide polyols.

The polyester is produced using conventional techniques with the reaction conditions and the ratio of reactants chosen so as to provide a product having residual hydroxyl groups, i.e., a polyester polyol. The number of hydroxyls present in the product can be varied, but it is preferred that its hydroxyl value be at least about 20 and preferably more than about 50.

The overall functionality per unit weight of the polyhydric material used to produce the polyurethane polyol is important. The polyhydric material should contain (i.e., be formed from) more than about one gram-mole of compounds having a functionality of 3 or more per 500 grams of the polyhydric material and preferably contains between about 0.01 and 0.9 grammoles of such compounds. By "functionality" is meant the number of reactive hydroxyl and carboxyl groups per molecule, with anhydride groups being considered as equivalent to two carboxyl groups. It is noted that certain compounds useful in this invention contain both hydroxyl and carboxyl groups; exampls include 6-hydroxyhexanoic acid, 8-hydroxyoctanic acid, and tartaric acid.

While the polyether polyol or the polyester polyol may constitute the entire polyhydric component, mixtures of polyether polyols and mixtures of polyester polyols, as well as mixtures of polyether and polyester polyols, may be used in widely varied proportions. In addition, other hydroxyl-containing compounds may be added either with the polyhydric material to the polyisocyanate, or to the reaction mixture of the polyhydric material and the polyisocyanate. Such compounds include polyfunctional alcohols, such as 1,4-butanediol, amino alcohols, neopentyl glycol, trimethylolpropane, tris(hydroxyethyl) isocyanurate, N,N'-bis(hydroxyethyl) dimethyl hydantoin, and Ester Diol 204 (2,2-dimethyl-3-hydroxypropyl-2,2-dimethyl-3-hydroxypropionate); carbamates of polyols, such as 0-hydroxyethylcarbamate and O,N-bis(hydroxyethyl)carbamate; and monohydric alcohols. Finally, other active hydrogen-containing compounds may be added to the reaction mixture, including water; polyamines such as isophorone diamine, p-methane diamine, propylene diamine, hexamethylene diamine, and diethylene triamine; and mixtures of the above-mentioned polyamines with ketones, such as cyclohexanone, butanone and acetone. When using polyamines and ketones, it is preferable to partially react the two, as by holding at room temperature for about one hour, before adding to the urethane reaction mixture, although acceptable results for some purposes are obtained by merely adding the amine and ketone to the reaction mixtue.

The polyisocyanate which is reacted with the polyhydric material can be essentially any organic polyisocyanate, e.g., hydrocarbon polyisocyanates or substituted hydrocarbon diisocyanates. Many such organic polyisocyanates are known in the art, including p-phenylene diisocyanate, biphenyl diisocyanate, toluene diisocyanate, 3,3'-dimethyl-4,4'-biphenylene diisocyanate, 1,4-tetramethylene diisocyanate, 1,6-hexamethylene diisocyanate, 2,2,4-trimethylhexane-1,6-diisocyanate, methylene bis(phenyl isocyanate), lysine methyl ester diisocyanate, bis(isocyanatoethyl) fumarate, isophorone diisocyanate and methyl cyclohexyl diisocyanate. There can also be employed isocyanate-terminated adduct of diols, such as ethylene glycol, 1,4-butylene glycol, polyalkylene glycols, etc. These are formed by reacting more than one mole of a diisocyanate, such as those mentioned, with one mole of a diol to form a longer chain diisocyanate. Alternatively, the diol can be added along with the diisocyanate.

While diisocyanates are preferred, higher polyisocyanates can be utilized as part of the organic polyisocyanate. Examples are 1,2,4-benzene triisocyanate and polymethylene polyphenyl isocyanate.

It is preferred to employ an aliphatic diisocyanate, since it has been found that these provide better color stability in the finished coating. Examples include bis(isocyanatocyclohexyl) methane; 1,4-butylene diisocyanate, isophroone diisocyanate; and methyl cyclohexyl diisocyanate.

The conditions of the reaction between the polyhydric material and the polyisocyanate are chosen so as to produce a hydroxyl-containing urethane reaction product, i.e., a polyurethane polyol. This can be accomplished by utilizing an equivalent ratio of isocyanate groups to hydroxyl groups of less than 1.0, controlling the polyol and mono-alcohol content as noted earlier, and allowing substantially all the isocyanate groups present to react. Alternatively, regardless of the equivalent ratio selected, a compound may be added to the reaction mixture, which will react with residual isocyanate groups and which will effectively terminate the reaction. Suitable compounds include water; ammonia; polyfunctinnal alcohols, such as ethylene glycol, aminoalcohol, tris(hydroxyethyl) isocyanurate, N,N'-bis(hydroxyethyl) dimethyl hydantoin, and trimethylol propane; monofunctional alcohols, such as n-butanol and the like; primary and secondary amines, such as butylamine, morpholine, allylamine and diethylamine; and, the hereinabove-described polyester polyols. It is noted that the amount of terminating agent added is such that the equivalent ratio of residual isocyanate groups to the isocyanate-reactive groups of the terminating agent is less than about one.

In one preferred embodiment of the invention, a polyfunctional alcohol is used to terminate the reaction at the desired stage (determined by the viscosity), thereby also contributing residual hydroxyl groups. Particularly desirable for such purposes are aminoalcohols such as ethanol-amine, propanolamine, hydroxyethyl piperazine, and diethanolamine, since the amino groups preferentially react with the isocyanate groups present. Polyols, such as ethylene glycol, trimethylolpropane and hydroxyl-terminated polyesters, can also be employed in this manner.

While the ratios of the components of the polyhydric material, the polyisocyanate and any terminating agent may be varied, it will be recognized by those skilled in this art that the amounts of the components shoudl be chosen so as to avoid gelation and so as to produce an ungelled, urethane reaction product which contains hydroxyl groups. The hydroxyl value (as deteermined ab ASTM Designation E 22-67, Method B) of the urethane reaction product should be at least 10 and in most cases is between about 20 and about 200.

The polyester polyols and the polyether polyols described above may themselves be used as the thermosetting resin component of the instant invention. When used by themselves, some material of functionality of 3 or more must be present in order to provide good films. Thus, the polyester or the polyether shall contain (i.e., be formed from) at least about 0.01 and not more than about one gram-mole of compounds of functionality of 3 or more per 500 grams of the reactants used to produce the polyester polyol or the polyether polyol.

The polyester polyols, polyether polyols, polyurethane polyols and the methods of manufacture thereof are more fully described in U.S. application Ser. Nos. 828,337, filed May 27, 1969, now abandoned; U.S. Ser. No. 839,648, filed July 7, 1969, now abandoned; U.S, Ser. No. 313,060, filed Dec. 7, 1972, now abandoned; U.S. Ser. No. 347,022 filed Apr. 2, 1973, now abandoned and U.S. Ser. No. 361,010 filed May 16, 1973, now abandoned.

Also useful as the thermosetting resin are hydroxyl-containing polyacrylates having values of from 5 to 200. The preferred polyacrylates are those containing hydroxyl groups derived from monoacrylates or methacrylates of a diol such as hydroxyalkyl esters in which the alkyl group has up to about 12 carbon atoms, such as acrylic acid and methacrylic acid esters of ethylene glycol and 1,2-propylene glycol. Examples include hydroxylethyl acrylate and methacrylate and hydroxylpropyl methacrylate as well as polyethylene glycol monoacrylate and polycaprolactone monoacrylate. Other useful hydroxyalkylesters include hydroxybutyl acrylate, hydroxyoctyl methacrylate, glyceryl acrylate, and the like.

The aminoplast resin used to cure the thermosetting resins may be any aldehyde condensation product of melamine, urea, and similar compounds; products obtained from the reaction of formaldehyde with melamine, urea or benzoguanamine are most common and are preferred herein. However, condensation products of other amines and amides can also be employed, for example, aldehyde condensates of triazines, diazines, triazoles, guanidines, guanamines and alkyl and aryl-substituted derivates of such compounds, including alkyl and aryl-substituted ureas and alkyl and aryl substituted melamines. Some examples of such compounds are N,N'-dimethylurea, benzourea, dicyandiamine, formoguanamine, acetoguanamine, ammeline, 2-chloro-4,6-diamino-1,3,5-triazine, 6-methyl-2,4-diamino-1,3,5-triazine, 3,5-diamino-triazole, triaminopyrimidine, 2-mercapto-4,6-diamino-pyrimidine, 2,4,6-triethyl triamino-1,3,5-triazone, and the like.

While the aldehyde employed is most often formaldehyde, other similar condensation products ca be made from other aldehydes, such as acetaldehyde, crotonaldehyde, acrolein, benzaldehyde, furfural, and others.

The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, hepanol and others, as well as benzyl alcohol and other aromatic alcohols, cyclic alcohol such as cyclohexanol, monoethers of glycols such as Cellosolves and Carbitols, and halogen-substituted or other substituted alcohols, such as 3-chloropropanol. The preferred amine-aldehyde resins are substantially etherified with methanol or butanol.

The amounts of individual components in the coating compositions of this invention can be varied over a wide range. Preferably, however, the compositions contain from 5 to about 50 percent by weight of the aminoplast resin, and from about 0.01 to about 5 percent by weight of the 1,4-diazo[2,2,2]-bicyclooctane. It has been found that 1,4-diazo[2,2,2]-bicyclooctane contents greater than about 5 percent give no added advantage although acceptable results are obtained therefrom.

The aminoplast is combined with the thermosetting resin and may be used with or without known catalysts. The resin is then cured by heating. Generally the resin is heated to about 140° to 400° F. for 1 to 60 minutes to cure. The 1,4-diazo[2,2,2]-bicyclooctane may be added either before, during or after the addition of aminoplast resin.

For optimum properties when the thermosetting resin is a polyurethane polyol, for many purposes it is prefered to include in the composition a polymeric polyol having a low glass transition temperature, i.e., having a glass transition temperature below about 25° C. The inclusion of such a polymeric polyol gives a balance of flexibility and hardness. Among the preferred polymeric polyols are polyether polyols; especially preferred are poly(oxyalkylene)glycols such as polyethylene glycol, polypropylene glycol, and other such glycols having up to about 6 carbon atoms separating each pair of eoxygen atoms. A specific preferred polyol is poly(oxytetramethylene)glycol. Other highly desirable polyols are polyester polyols having the desired glass transition temperature, especially those produced from acyclic reactants such as adipic acid and azelaic acid and alkylene glycols; poly(neopentyl adipate) is a useful example. Still other polymeric polyols of suitable properties include condensates of lactones with polyols, such as the product from caprolactone and ethylene glycol, propylene glycol, trimethylolpropane, etc.

The polymeric polyol can be incorporated into the composition in various ways. In some instances, the polyhydric material employed can serve as the polymeric polyol, but this does not usually provide a coating of suitable hardness. More usually, the "soft" polymeric polyol is used in conjunction with a polyhydric material (or constituent thereof) having a higher glass transition temperature. One method is to include the polymeric polyol in the polyhydric material as part of the polyol componet; another way is to produce an isocyanato-terminated adduct or prepolymer from the polymeric polyol and the polyisocyanate; a third method is to blend the polymeric polyol as such with the polyhydric material, before or after the polyhydric material is reacted with the polyisocyanate; alternatively the polymeric polyol can be blended with the aminoplasts before addition to the reaction product. The choice of method depends upon the particular components used and the properties desired, but in each instance the product contains both "hard" and "soft" segments in a type of block copolymer in the cured coating.

The proportions of the above components can be varied to provide certain properties. For example, higher levels of polymeric polyol result in somewhat softer and more extensible coatings, whereas harder, more resistant coatings are obtained by increasing the proportion of aminoplast resin. The amount employed depend in large part upon the nature of the particular components, e.g., the specific polyhydric material, aminoplast resin, as well as the type of polymeric polyol, if any, employed.

In addition to the componets above, the compositions ordinarily contain other optional ingredients, including varius pigments of the type ordinarily utilized in coatings of this general class. In addition, various fillers, plasticizers, anti-oxidants, flow control agents, surfactants and other such formulating additives are employed in many instances. The composition is ordinarily contained in a solvent, which can be any solvent or solvent mixture in which the materials employed are compatible and soluble to the desired extent. Acid catalysts and other curing catalysts can be added to aid in curing if desired; these can permit the use of lower temperatures and/or shorter times. When using such catalysts, it has been found that small amounts of alcohol (e.g. isopropyl, butyl, and the like) are generally needed to stabilize the one package system.

The composition herein can be applied by any conventional method, including brushing, dipping, flow coating, etc., but they are most often applied by spraying. Usual spray techniques and equipment are utilized. They can be applied over virtually any substrate, including wood, metals, glass, cloth, plastics, foams, and the like.

The invention will be further described in connection with several examples which follow. These examples are given as illustrative of the invention and are not to be construed as limiting it to their details. All parts and percentages in the examples and throughout the specification are by weight unless otherwise indicated.

EXAMPLE I

A polyester polyol was prepared by charging a reaction vessel with the following:

|  | Parts by Weight |
| --- | --- |
| Neopentyl glycol | 2880 |
| Adipic acid | 1640 |
| Trimethylolpropane | 503 |
| Isophthalic acid | 2800 |

The mixture was heated from 180° to 250° C. until a total of about 1000 parts of water had been removed, and the resin had an acid value of about 6. The resin was then thinned with 3200 parts of methylbutyl ketone to give a resin with an acid value of about 4.2 an hydroxyl value of about 56 at 67 percent solids and a Gardner-Holdt viscosity of Q+.

A reaction mixture was formed using the polyester polyol so produced by blending the following:

|  | Parts by Weight |
| --- | --- |
| Polyester polyol | 9300 |
| Methane-bis (cyclohexyl isocyanate) (Hylene W) | 695 |
| Methyl butyl ketone | 1500 |

The mixture was heated at 80° C. for 10 hours after which time 16.1 parts of monethanolamine, 330 parts of butyl alcohol and 775 parts of isopropyl alcohol were added to terminate the reaction. The resin had an acid value of about 3.7 at 55 percent solids.

A white coating was then formulated by blending the following:

| | Parts by Weight |
|---|---|
| Polyurethane polyol | 184 |
| Butylated melamine foramaldehyde resin | 78 |
| Cellulose acetate-butyrate | 20 |
| Polyester resin [1] | |
| Antioxidant (Santowhite, available from Monsanto) | 4.0 |
| UV absorber (Tinuvin 328, available from Eastman Kodak) | 4.0 |
| p-Toluene sulfonic acid | 1.0 |
| Diethylamine | 0.6 |
| Silicone oil surfactant (SF 1023, available from General Electric) | 3.0 |
| Butyl alcohol | 44 |
| Methylisobutyl ketone | 132 |
| Pigment paste [2] | |

[1] The polyester resin used was composed of 670 parts of neopentyl glycol, 468 parts of trimethylolpropane, 705 parts of sebacic acid, 870 parts of isophthalic acid, and 19 parts of hydroxyethylethylenimine.
[2] The pigment paste is prepared by dispersing 19.0 parts of the polyester described in [1], 61.5 parts of titanium dioxide and 19.5 parts of isobutyl acetate in a Zircoa mill.

The above coating formulation was used as a standard coating to which were added various amines to test their effect on gloss retention of the cured coatings as follows:

| | Percent Added |
|---|---|
| Triethylenediamine | 0.05 |
| Triethylenediamine | 0.5 |
| Triethylenediamine | 1.0 |

The above coatings were then spray applied to metal and to a microcellular urethane foam, and cured for 30 minutes at 250° F.

In each instance, the amine stabilizer greatly increased the gloss loss stability of the coated film.

EXAMPLE II

A polyester polyol is prepared by charging a reaction vessel with the following:

| | Parts by Weight |
|---|---|
| Neopentyl glycol | 126.9 |
| Trimethylolpropane | 22.1 |
| Adipic acid | 72.3 |
| Isophthalic acid | 123.2 |

This mixture was heated to 220° C, with removal of water until the resin had a Gardner-Holdt viscosity of F (60 percent solids in methyl ethyl ketone), an acid value of about 10 and a hydroxyl value of about 100. A reaction mixture was formed using the polyester polyol so produced by blending the following:

| | Parts by weight |
|---|---|
| Polyester | 70 |
| Methyl ethyl ketone | 35 |
| Methane-bis (cyclohexyl isocyanate) | 7.13 |
| Triethylene diamine | 0.39 |

This mixture was held at 47° C for 11 hours and then at 67° C. for 5 more hours. There were then added 22 parts of n-butanol and 0.3 part of ethanolamine. The product had a Gardner-Holdt viscosity of Z1–Z2, a non-volatile solids content of about 60 percent and an acid value of 3.7.

A white coating composition was formulated using the urethane reaction product thus produced by blending the following:

| | Parts by Weight |
|---|---|
| Urethane reaction product | 140 |
| Butylated melamine formaldehyde resin | 39 |
| Poly(oxytetramethylene)glycol | 10 |
| p-Toluene sulfonic acid | 0.4 |
| Silicone oil surfactant (SF 1023) | 4 |
| Pigment paste* | 8.2 |
| Methyl isobutyl ketone | 52 |

*The pigment paste employed was made in a solution of the above described urethane reaction product by blending the following:

| | Parts by Weight |
|---|---|
| Urethane reaction product | 25 |
| TiO$_2$ | 55 |
| Cellosolve acetate | |
| Methyl isobutyl ketone | 10 |
| Butanol | 10.5 |

A coating composition was formulated utilizing the same polyurethane polyol, but without the use of the triethylene diamine stabilizer. Both composition were then coated on a substrate and heated at 250° F. for 60 minutes. The two films were then tested for stability to gloss loss in a weatherometer after Florida exposure, with the resulting being tabulated below:

| Coating | Initial Gloss (20°) | 3 Mos. | 6 Mos. | 9 Mos. | 12 Mos. | 18 Mos. |
|---|---|---|---|---|---|---|
| With Stabilizer | 87 | 72 | 56 | 55 | 38 | 21 |
| Without Stabilizer | 68 | 51 | 40 | 40 | 33 | 15 |

As can be readily seen from the above results, the use of the triethylenediamine stabilizer greatly increased the gloss loss stability of the coated films.

EXAMPLE III

Two coating composition, similar to those formulated in Example I, except that a medium blue metallic paste was substituted for the TiO$_2$ paste therein, were applied to a substrate and heated at 250° F. for 60 minutes. The two films were then tested for stability to gloss loss in a weatherometer after Florida exposure, with the resulting being tabulated below:

| Coating | Initial Gloss (20°) | 3 Mos. | 6 Mos. |
|---|---|---|---|
| With stabilizer | 82 | 60 | 44 |
| Without stabilizer | 80 | 45 | 34 |

As can be seen from the above results, the use of the triethylene diamine stabilizer increased the gloss loss stability of the coated film.

EXAMPLE IV

The following were charged to a reaction vessel:

| | Parts by Weight |
|---|---|
| Polycaprolactone diol (reaction product of caprolactone and diethylene glycol; molecular weight - 1250) | 1170 |
| Methylbutyl ketone | 500 |
| Methane-bis (cyclohexyl isocyanate) | 560 |
| Triethylenediamine | 9.4 |

The mixture was heated and held at 120° C. for about 1 hour. Ninety parts of trimethylol propane and a homogeneous mixture of 88 parts of isophorone diamine and 176 parts of cyclohexanone were then added to the reaction mixture.

After about four and one-half hours at 95° C., 15 parts of monoethanolamine, 98 parts of n-butanol and 294 parts of isopropanol were added to terminate the reaction. The resultant urethane resin had an acid value of 0.34, and a Gardner-Holdt viscosity of Z5–Z6.

A coating composition was then formulated by blending the following :

| | Parts by Weight |
|---|---|
| Urethane reaction product | 153 |
| Melamine resin | 31 |
| p-Toluene sulfonic acid | 1 |
| Pigment paste* | 90 |
| Silicone oil surfactant (SF 1023) | 4 |
| Silicone slip agent (DC 200, available from Dow-Corning) | 1 |
| Isopropanol | 48 |
| Tinuvin 328 | 1 |

*The pigment paste was employed made in a solution of the above-described urethane reaction product by blending the following:

| | Parts by Weight |
|---|---|
| Urethane reaction product | 25 |
| TiO$_2$ | 55 |
| Cellosolve acetate | 10 |
| n-butanol | 10 |

A second coating composition was formulated, without the use of the triethylenediamine stabilizer. Both compositions were then coated on a substrate and heated at 250° F. for 30 minutes. The two films were then tested for stability to gloss loss in a weatherometer after Florida exposure, with the results being tabulated below:

| Coating | Initial Gloss (20°) | 3 Mos. | 6 Mos. | 9 Mos. | 12 Mos. | 18 Mos. |
|---|---|---|---|---|---|---|
| With stabilizer | 90 | 61 | 39 | 38 | 34 | 19 |
| Without stabilizer | 73 | 8 | 6 | 4 | 3 | 2 |

EXAMPLE V

As can readily be seen from the above results, that the use of the triethylenediamine greatly increases the gloss loss stability of the coated films.

Two coating compositions, similar to those of Example IV, except that a medium blue pigment is substituted for the TiO$_2$ paste therein, were applied to a substrate and heated at 250° F. for 60 minutes. The two films were then tested for stability to gloss loss in a weatherometer after Florida exposure, with the results being tabulated below:

| Coating | Initial Gloss (20°) | 3 Mos. | 6 Mos. | 9 Mos. | 12 Mos. |
|---|---|---|---|---|---|
| With stabilizer | 87 | 51 | 26 | 23 | 13 |
| Without stabilizer | 77 | 19 | 10 | 7 | 4 |

As can be readily seen, the use of triethylene diamine greatly increases the gloss loss stability of the coated films.

In a similar manner, coating compositions of desirable properties are attainable by using other tertiary and secondary amines, as set forth in the specification.

According to the provisions of the Patent Statutes, there are described above the invention and what are now considered to be its best embodiments. However, within the scope of the appended claims, it is to be understood that the invention can be practiced otherwise than as specifically described.

We claim:

1. A stabilized coating composition comprising a polymeric polyol selected from the group consisting of polyester polyols, polyether polyols, polyurethane polyols and hydroxyl containing polyacrylates, an aminoplast resin to cure said polymeric polyol and 1,4-diazo[2,2,2]-bicyclooctane being present in an amount sufficient to stabilize the gloss retention of said coating composition.

2. The composition of claim 1 in which the polymeric polyol is a polyurethane polyol.

3. The composition of claim 1 wherein the polymeric polyol is an ungelled polyurethane polyol, said polyol being the reaction product of:
   (A) a polyhydric material, the major portion of which is a polyester polyol formed from
      (1) an alochol component having an average functionality of at least about 1.9, and
      (2) an acid component consisting essentially of one or more monomeric carboxylic acids or anhydrides having 2 to 14 carbon atoms per molecule, said acid component having an average functionality of at least about 1.9;
   said polyhydric materic containing a totoal of not more than about one gram-mole of compounds having a functionality of 3 or more per 500 grams; and
   (B) an organic polyisocyanate; said polyurethane polyol having a hydroxyl value of at least about 10.

4. The composition of claim 1 in which the polymeric polyol is a polyester polyol having a hydroxyl values of at least 30.

5. The composition of claim 1 wherein the polymeric polyol is a polyether polyol having a hydroxy equivalent of at least 100.

6. The composition of claim 1 wherein the polymeric polyol is a hydroxyl-containing polyacrylate having a hydroxyl value of at least 5.

7. A method of stabilizing the gloss retention of a coating composition comprising a polymeric polyol, an aminoplast resin to cure said polymeric polyol comprising adding at least 0.01 percent by weight of 1,4-diazo[2,2,2]-bicyclooctane to said coating composition.

8. The method of claim 7 wherein said polymeric polyol is a polyurethane polyol.

9. The method of claim 7 wherein the polymeric polyol is an ungelled polyurethane polyol, said polyol being the reaction product of:
   (A) a polyhydric material, the major portion of which is a polyester polyol formed from
      (1) an alcohol component having an average functionality of at least about 1.9, and
      (2) an acid component consisting essentially of one or more monomeric carboxylic acids or anhydrides having 2 to 14 carbon atoms per molecule, said acid component having an average functionality of at least about 1.9;
   said polyhydric material containing a total of not more than about one gram-mole of compounds having a functionality of 3 or more per 500 grams; and
   (B) an organic polyisocyanate; said polyurethane polyol having a hydroxyl value of at least 10.

10. The method of claim 7 wherein the polymeric polyol is a polyester polyol having a hydroxyl value of at least 30.

11. The method of claim 7 wherein the polymeric polyol is a polyether polyol having a hydroxyl equivalent of at least 100.

12. The method of claim 7 wherein the polymeric polyol is a hydroxyl-containing polyacrylate having a hydroxyl value of at least 5.